United States Patent
Katayama

(10) Patent No.: US 10,890,111 B2
(45) Date of Patent: Jan. 12, 2021

(54) ACOUSTIC INSULATION SYSTEM FOR INTERNAL COMBUSTION ENGINE

(71) Applicant: TOYOTA JIDOSHA KABUSHIKI KAISHA, Toyota (JP)

(72) Inventor: Haruyuki Katayama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/279,534

(22) Filed: Feb. 19, 2019

(65) Prior Publication Data

US 2019/0316518 A1  Oct. 17, 2019

(30) Foreign Application Priority Data

Apr. 17, 2018 (JP) ................................. 2018-079351

(51) Int. Cl.
| | |
|---|---|
| F01P 7/02 | (2006.01) |
| F02B 77/13 | (2006.01) |
| F01P 5/02 | (2006.01) |
| G10K 11/162 | (2006.01) |

(52) U.S. Cl.
CPC ............... *F02B 77/13* (2013.01); *F01P 5/02* (2013.01); *F01P 7/02* (2013.01); *G10K 11/162* (2013.01); *F01P 2005/025* (2013.01)

(58) Field of Classification Search
CPC ..... F02B 77/13; B60R 13/0884; B60R 13/08; B60K 11/08; B60K 11/04; F01P 5/06
USPC ..................................................... 123/41.04
See application file for complete search history.

(56) References Cited

U.S. PATENT DOCUMENTS

| | | | | |
|---|---|---|---|---|
| 3,951,114 A | * | 4/1976 | Fachbach | F02B 77/13 123/41.7 |
| 4,071,009 A | * | 1/1978 | Kraina | B60R 13/0838 123/198 E |
| 4,203,407 A | * | 5/1980 | Fachbach | F01N 3/05 123/198 E |
| 4,226,217 A | * | 10/1980 | Haslbeck | B60R 13/0838 123/195 C |
| 4,459,944 A | * | 7/1984 | Kirchweger | B60R 13/0838 123/195 C |
| 5,269,264 A | * | 12/1993 | Weinhold | B60K 11/085 123/198 E |
| 7,300,485 B1 | * | 11/2007 | Moore | B03C 3/017 131/233 |
| 7,325,518 B2 | * | 2/2008 | Bering | F01P 5/06 123/41.01 |

(Continued)

FOREIGN PATENT DOCUMENTS

| | | |
|---|---|---|
| GB | 2025520 A | 1/1980 |
| GB | 2308343 A | 6/1997 |
| JP | 2017-013638 A | 1/2017 |

*Primary Examiner* — Long T Tran
*Assistant Examiner* — James J Kim
(74) *Attorney, Agent, or Firm* — Oliff PLC

(57) ABSTRACT

An acoustic insulation system for an internal combustion engine mounted on a vehicle according to the present disclosure includes: an acoustic insulation cover configured to cover the internal combustion engine with a gap interposed between the acoustic insulation cover and the internal combustion engine; a first fan configured to introduce air toward the interior of the acoustic insulation cover; and a second fan configured to discharge air from the interior of the acoustic insulation cover.

5 Claims, 5 Drawing Sheets

(56) References Cited

U.S. PATENT DOCUMENTS

| | | | |
|---|---|---|---|
| 8,684,116 B2 * | 4/2014 | Nakashima | F01P 11/12 180/68.1 |
| 2010/0226792 A1 * | 9/2010 | Sato | F04D 27/001 417/1 |
| 2011/0120171 A1 * | 5/2011 | Cho | F28B 1/06 62/428 |
| 2015/0261268 A1 * | 9/2015 | Gong | G06F 1/206 361/679.5 |
| 2019/0073005 A1 * | 3/2019 | Han | G06F 1/181 |

* cited by examiner

Vehicle right side                Vehicle left side

ACOUSTIC INSULATION SYSTEM FOR INTERNAL COMBUSTION ENGINE

CROSS-REFERENCE TO RELATED APPLICATION

This application is based on and claims the benefit of Japanese Patent Application No. 2018-079351, filed on Apr. 17, 2018, which is incorporated by reference herein in its entirety.

BACKGROUND

Technical Field

The present disclosure relates to an acoustic insulation system for an internal combustion engine.

Background Art

For example, JP 2017-013638 A discloses a cooling control structure for an engine compartment. This cooling control structure is provided with a heat retention cover that covers the periphery of an internal combustion engine arranged in the engine compartment.

More specifically, one inlet and one outlet of cooling wind are each formed in the heat retention cover. In addition, an inlet opening/closing portion for adjusting the intake amount of the cooling wind is provided at a formation portion of the inlet, and an outlet opening/closing portion for adjusting the discharge amount of the cooling wind is provided at a formation portion of the outlet.

SUMMARY

According to the cooling control structure for the engine compartment disclosed in JP 2017-013638 A, a relative wind produced during running of a vehicle on which the internal combustion engine is mounted is used as the above-described cooling wind for cooling the internal combustion engine. During stop of the vehicle, the relative wind cannot be used. Thus, it becomes difficult to efficiently perform ventilation of the interior of the heat retention cover. In this respect, the structure disclosed in JP 2017-013638 A still has room for improvement in terms of achieving efficient ventilation of the interior of the heat retention cover when the relative wind cannot be used.

The present disclosure has been made to address the problem described above, and an object of the present disclosure is to provide an acoustic insulation system for an internal combustion engine that can efficiently perform ventilation of the interior of an acoustic insulation cover that covers an internal combustion engine even when relative wind cannot be used.

An acoustic insulation system for an internal combustion engine according to the present disclosure is applied to an internal combustion engine mounted on a vehicle. The acoustic insulation system includes: an acoustic insulation cover configured to cover the internal combustion engine with a gap interposed between the acoustic insulation cover and the internal combustion engine; a first fan configured to introduce air toward an interior of the acoustic insulation cover; and a second fan configured to discharge air from the interior of the acoustic insulation cover.

The acoustic insulation cover may include an opposed portion that is opposed to the second fan. The opposed portion may also include an opening portion and a flap configured to open and close the opening portion.

The flap may be configured to close during operation of the internal combustion engine and open during stop of the internal combustion engine.

The first fan and the second fan may be integrally arranged in parallel with a bulkhead interposed between the first fan and the second fan. The bulkhead may also be formed so as to protrude toward the internal combustion engine and separate a flow of air by the first fan from a flow of air by the second fan. The second fan may be further configured to blow air in a direction opposite to a flow direction of air by the first fan.

The first fan and the second fan may be integrally arranged in parallel with a bulkhead interposed between the first fan and the second fan. The bulkhead may also be formed so as to separate a flow of air by the first fan from a flow of air by the second fan. The flap may be further configured to close during operation of the internal combustion engine and open during stop of the internal combustion engine. The second fan may be further configured, during the stop of the internal combustion engine, to blow air in a direction opposite to a flow direction of air by the first fan.

The internal combustion engine may include a portion which is not covered by the acoustic insulation cover. The first fan may also be opposed to the internal combustion engine at the portion which is not covered by the acoustic insulation cover.

According to the acoustic insulation system for an internal combustion engine of the present disclosure, air can be introduced toward the interior of the acoustic insulation cover by the use of the first fan, and air can be discharged from the interior of the acoustic insulation cover by the use of the second fan. Thus, according to the acoustic insulation system of the present disclosure, even when, since the internal combustion engine is stopped and the vehicle is also stopped accordingly, the relative wind cannot be used, ventilation of the interior of the acoustic insulation cover can be efficiently performed.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

1-1. Configuration of Acoustic Insulation System

1-1-1. Configuration of Internal Combustion Engine and Therearound

Figure 1:
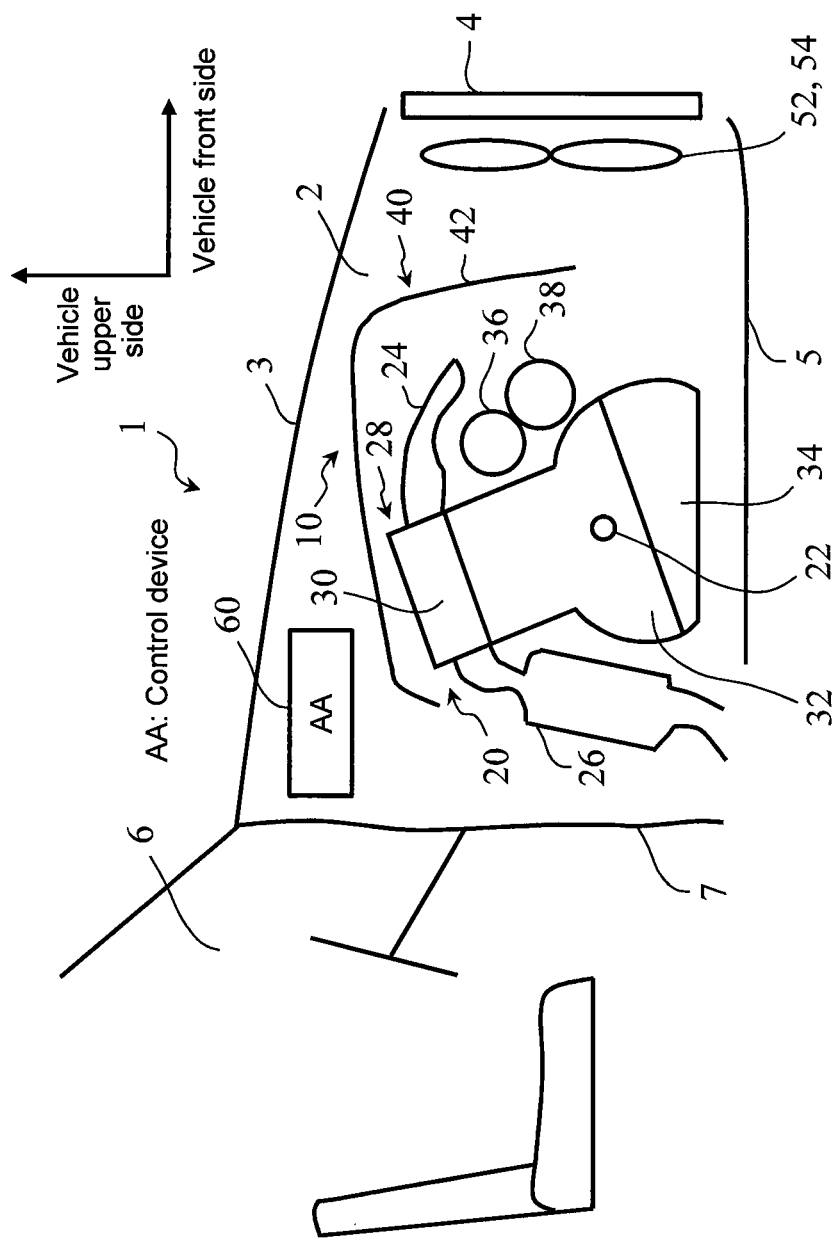
FIG. 1 is a diagram (vehicle side view) that schematically illustrates the configuration of an internal combustion engine to which an acoustic insulation system according to a first embodiment of the present disclosure is applied and around the internal combustion engine.

FIG. 1 is a diagram (vehicle side view) that schematically illustrates the configuration of an internal combustion engine 20 to which an acoustic insulation system 10 according to the first embodiment of the present disclosure is applied and around the internal combustion engine 20. As shown in FIG. 1, the internal combustion engine 20 is mounted on a vehicle 1. In more detail, the internal combustion engine 20 is installed in an engine compartment 2 of the vehicle 1.

In FIG. 1, the upper side of the sheet corresponds to the front side of the vehicle 1, and the left side of the sheet corresponds to the upper side of the vehicle 1. An engine hood 3 is arranged at the vehicle upper side of the internal combustion engine 20. A radiator 4 and cooling fans (first fan 52 and second fan 54 described later) are arranged at the vehicle front side of the internal combustion engine 20. In addition, an engine lower cover 5 is arranged at the vehicle lower side of the internal combustion engine 20, and a bulkhead 7 (such as, cowl top panel and dash panel) that separates the engine compartment 2 from a vehicle interior 6 is arranged at the vehicle rear side. It should be noted that vehicle components (not shown), such as a suspension tower, are arranged at both the vehicle-left-and-right sides of the internal combustion engine 20.

In the example shown in FIG. 1, the internal combustion engine 20 is mounted on the vehicle 1 such that the axial direction of a crankshaft 22 coincides with the left-right direction of the vehicle 1. Also, in the example shown in FIG. 1, the internal combustion engine 20 is mounted on the vehicle 1 such that intake system parts including an intake manifold 24 are located on the vehicle front side and exhaust system parts including an exhaust manifold 26 are located on the vehicle rear side.

Moreover, the internal combustion engine 20 is equipped with an engine main body 28. The engine main body 28 includes a cylinder head (including a cylinder head cover) 30, a cylinder block (including a crankcase) 32 and an oil pan 34 in addition to the crankshaft 22 described above. The cylinder head 30 is installed on the cylinder block 32. The oil pan 34 is arranged below the cylinder block 32. An engine lubricating oil that lubricates individual portions of the internal combustion engine 20 is stored in the interior of the oil pan 34.

Furthermore, the internal combustion engine 20 is equipped with an alternator 36 and a compressor (hereunder, an "A/C compressor") 38 of an air conditioner for the vehicle interior 6. The alternator 36 performs electric power generation by the use of a torque of the crankshaft 22. The A/C compressor 38 supplies refrigerant for the air conditioner by the use of the torque of the crankshaft 22.

1-1-2. Configuration of Acoustic Insulation Cover (Acoustic Insulation Structure)

Figure 2:
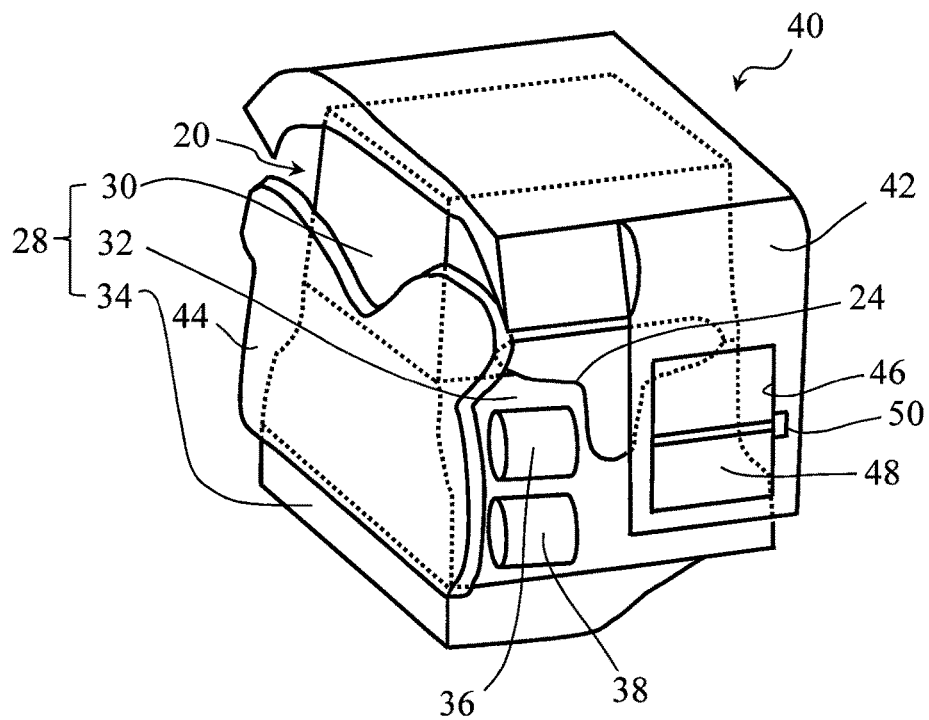
FIG. 2 is a schematic diagram (perspective view) that illustrates the internal combustion engine covered by an acoustic insulation cover.
Figure 3:
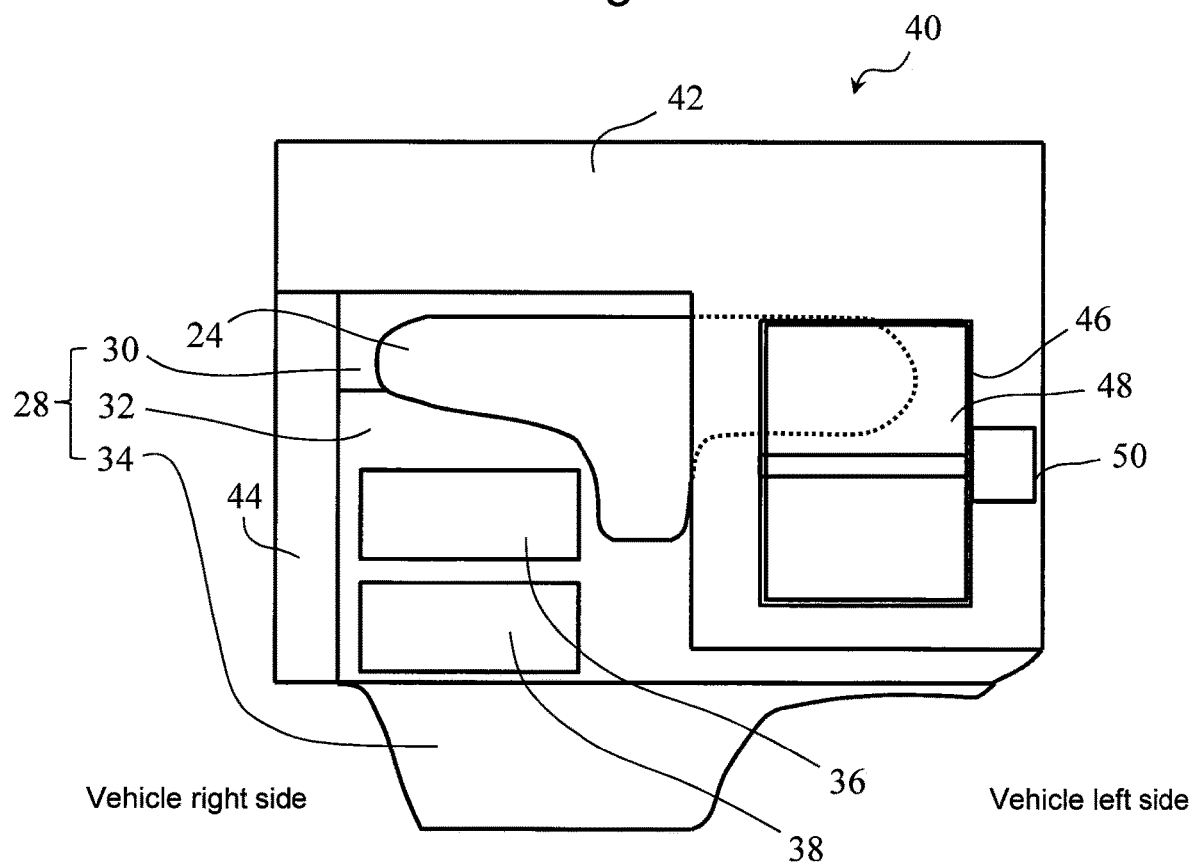
FIG. 3 is a schematic diagram (vehicle front view) that illustrates the internal combustion engine covered by the acoustic insulation cover.

As shown in FIG. 1, the acoustic insulation system 10 according to the present embodiment is provided with an acoustic insulation cover 40. Hereunder, the configuration of the acoustic insulation cover 40 will be described in detail with additional reference to FIGS. 2 and 3 as well as FIG. 1. FIGS. 2 and 3 are each schematic diagrams (perspective view and vehicle front view) that illustrate the internal combustion engine 20 covered by the acoustic insulation cover 40.

The acoustic insulation cover 40 is configured by a material having a high acoustic absorption performance. Moreover, as the material of the acoustic insulation cover 40, a material having a certain level of stiffness is used. An example of the material of the acoustic insulation cover 40 that satisfies this kind of requests is a fibrous material made of PET (Polyethylene terephthalate) fiber. It should be noted that, although the manner of attachment of the acoustic insulation cover 40 to the internal combustion engine 20 is not particularly limited, the acoustic insulation cover 40 is attached to the internal combustion engine 20 using, as an example, a fastener (such as bolts) which is not shown.

According to the example shown in FIG. 1, the acoustic insulation cover 40 is configured by two cover pieces 42 and 44 divided from each other. The acoustic insulation cover 40 (each of the cover pieces 42 and 44) covers the internal combustion engine 20 with a gap interposed between the acoustic insulation cover 40 and the internal combustion engine 20.

To be more specific, as shown in FIGS. 1 to 3, the cover piece 42 is formed so as to cover a part of an upper portion of the internal combustion engine 20 and a portion thereof located on the vehicle front side. In detail, the cover piece 42 mainly covers an upper portion of the engine main body 28, and a part of respective portions of the intake manifold 24 and the engine main body 28 (cylinder block 32) located on the vehicle front side (i.e., a portion located on the vehicle left side in the vehicle front view). In other words, according to the example of the acoustic insulation cover 40, portions of the intake manifold 24 and the engine main body 28 (cylinder block 32) located on the vehicle right side in the vehicle front view, and the alternator 36 and the A/C compressor 38 are not covered by the acoustic insulation cover 40 including the cover piece 42.

On the other hand, as shown in FIGS. 2 and 3, the cover piece 44 is formed so as to cover a major part (mainly, cylinder block 32) of a portion (side end surface) of the engine main body 28 located on the vehicle right side.

Furthermore, as shown in FIGS. 2 and 3, the acoustic insulation cover 40 includes an opening portion 46 and a movable flap 48 operative to open and close the opening portion 46. In detail, the opening portion 46 is formed at a portion of the cover piece 42 located on the vehicle front side. The flap 48 is of an electrically-driven type, as an example, and is driven to open and close by an electric motor 50. FIG. 3 shows a closed state of the flap 48. In this state, the flap 48 functions as a part of the cover piece 42. If the flap 48 is opened, a part of the portions of the intake manifold 24 and the engine main body 28 (cylinder block 32) located on the vehicle left side in the vehicle front view is exposed to the engine compartment 2 at the opening portion 46.

1-1-3. First and Second Fans

The acoustic insulation system 10 further includes a first fan 52 and a second fan 54. As described below, the first fan 52 has a function that introduces air (outside air) toward the interior of the acoustic insulation cover 40, and the second fan 54 has a function that discharges air from the interior of the acoustic insulation cover 40. As shown in FIG. 1, the first and second fans 52 and 54 are attached to a portion of the radiator 4 located on the vehicle rear side in the engine compartment 2. Because of this, the first and second fans 52 and 54 according to the present embodiment have not only the above-described function in the acoustic insulation system 10 but also a function that supplies the radiator 4 with a cooling wind.

Figure 4A:
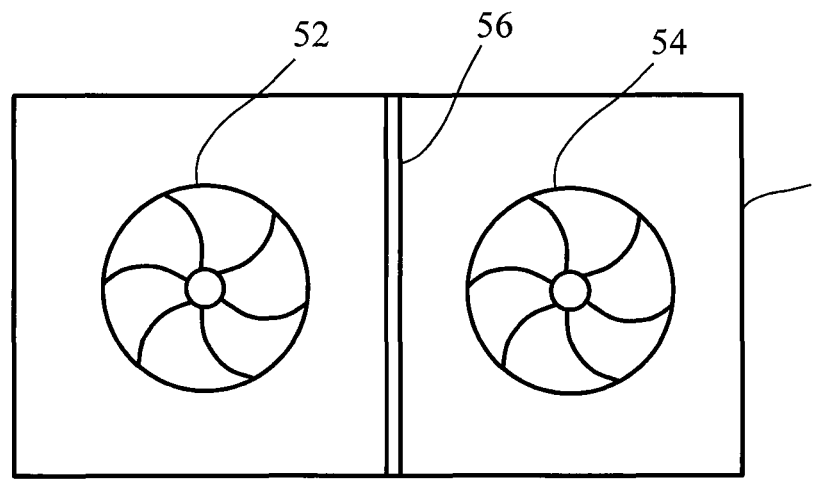
FIG. 4A is a diagram that schematically illustrates the configuration of first and second fans and the vicinity thereof.
Figure 4B:
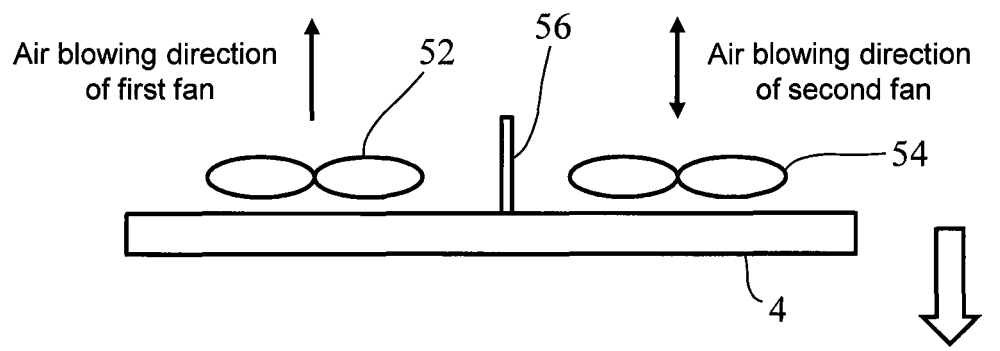
FIG. 4B is a diagram that schematically illustrates the configuration of the first and second fans and the vicinity thereof.

FIGS. 4A and 4B are diagrams that schematically illustrate the configuration of the first and second fans 52 and 54 and the vicinity thereof. FIG. 4A corresponds to a vehicle front view and FIG. 4B corresponds to a vehicle top view. As shown in these diagrams, the first fan 52 and the second fan 54 are integrally arranged in parallel with a bulkhead 56 interposed therebetween. In more detail, the first and second fans 52 and 54 are arranged in parallel along the left-right direction of the vehicle 1.

The first and second fans 52 and 54 are axial flow electric fans, and are respectively driven by electric motors (not shown). The air blowing direction (i.e., flow direction of air) of the first fan 52 and the air blowing direction (i.e., flow direction of air) of the second fan 54 are parallel to each other as shown in FIG. 4B.

To be more specific, the first fan 52 is arranged and configured so as to blow air toward the internal combustion engine 20 located on the vehicle rear side relative to the first fan 52. The flow direction of air toward the internal combustion engine 20 from the fans 52 and 54, and the rotational direction of the fans 52 and 54 at the time of the flow of air being generated in this flow direction are herein both referred to as "forward direction".

The second fan 54 is arranged and configured such that, when rotating in its forward direction, the second fan 54 blows air toward the vehicle rear side (i.e., the side of the internal combustion engine 20) similarly to the first fan 52. Also, the second fan 54 is configured to be rotatable in the direction opposite to the forward direction described above. Because of this, the second fan 54 can also blow air in the direction opposite to the flow direction of air by the first fan 52.

The bulkhead 56 is formed, as an example, into a plate shape, and is formed so as to protrude toward the internal combustion engine 20 (i.e., toward the vehicle rear side) and separate the air flow by the first fan 52 from the air flow by the second fan 54. In other words, the bulkhead 56 is formed so as to extend along the flow directions of air by the first and second fans 52 and 54. With this kind of bulkhead 56 arranged, when the first and second fans 52 and 54 are actuated such that the air blowing directions thereof are opposite to each other, occurrence of a phenomenon in which the wind by the first fan 52 is sucked out by the second fan 54 to the side of the radiator 4 before the wind is reached to the internal combustion engine 20 can be reduced.

Figure 6:
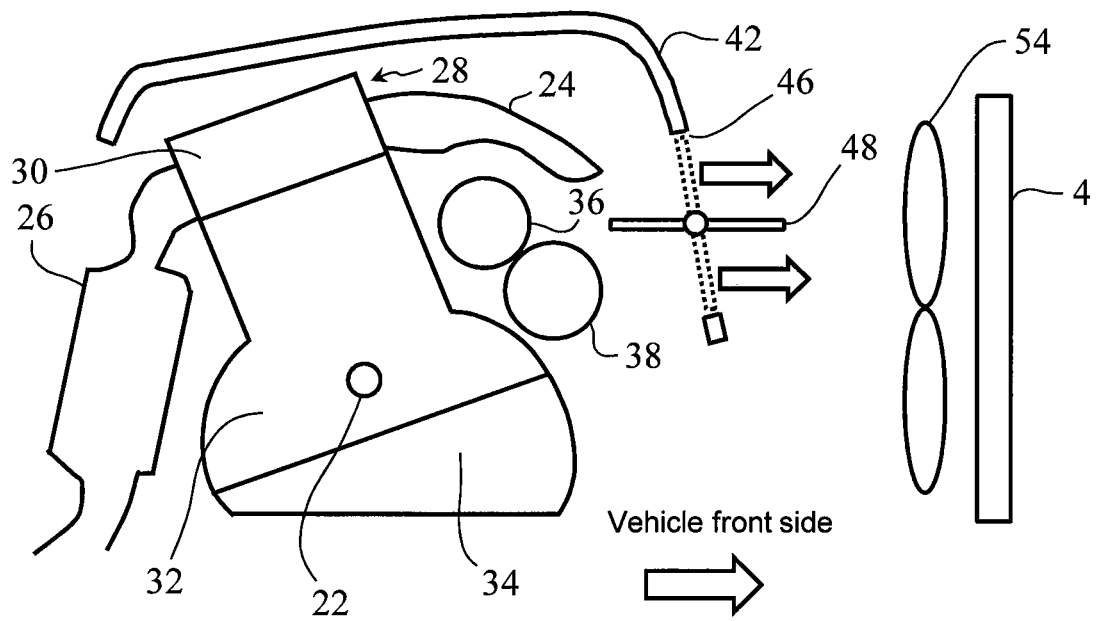
FIG. 6 is a diagram (vehicle side view) that schematically illustrates the internal combustion engine with the flap open.

Moreover, as can be well understood with reference to FIGS. 6 and 7 described later, the portion of the cover piece 42 located on the vehicle front side where the opening portion 46 and the flap 48 are arranged is opposed to the second fan 54. Because of this, this portion corresponds to an example of the "opposed portion" according to the present disclosure.

In further addition to the above, according to the acoustic insulation system 10, the first fan 52 is opposed to the internal combustion engine 20 at a portion located on the vehicle front side that is not covered by the acoustic insulation cover 40 (more specifically, the cover piece 42). As a result, the first fan 52 is opposed to the alternator 36 and the A/C compressor 38. The first fan 52 is also opposed to the respective portions of the intake manifold 24 and the engine main body 28 (cylinder block 32) located on the vehicle right side in the vehicle front view.

1-1-4. Control Device

The acoustic insulation system 10 according to the present embodiment is further provided with a control device 60 for controlling the flap 48 (electric motor 50), and the first and second fans 52 and 54. The control device 60 is an electronic control unit (ECU) that includes at least one processor, at least one memory, and an input/output interface.

The input/output interface receives sensor signals from a sensor used for determination as to whether the internal combustion engine 20 is in operation or is stopped, and also outputs actuating signals to the flap 48 (electric motor 50) and the first and second fans 52 and 54 which correspond to actuators. An example of the above-mentioned sensor is a crank angle sensor which is not shown. The control device 60 can calculate an engine speed by the use of crank angle signals from the crank angle sensor. The determination described above can be performed as follows, for example. That is to say, when the engine speed is not zero, it can be determined that the internal combustion engine 20 is in operation, and, on the other hand, when the engine speed is zero, it can be determined that the internal combustion engine 20 is stopped.

In the memory of the control device 60, various programs and various data (including maps) for controlling the acoustic insulation system 10 are stored. The processor executes the programs stored in the memory. As a result, various functions of the control device 60 (such as, introduction of air into the acoustic insulation cover 40, discharge of air from the acoustic insulation cover 40, and ventilation of the interior of the acoustic insulation cover 40 associated therewith) are achieved. It should be noted that the control device 60 may alternatively be configured with two ECUs that are separately provided for the respective first and second fans 52 and 54.

1-2. Operation of Acoustic Insulation System 1-2-1. Operation During Engine Operation During operation of the internal combustion engine 20, the control device 60 controls the electric motor 50 such that the flap 48 closes. As a result, the opening portion 46 is closed by the flap 48 as shown in FIG. 3. Moreover, during engine operation, the second fan 54 of the first and second fans 52 and 54 is mainly used, and the first fan 52 is additionally used as needed. Furthermore, during engine operation, the second fan 54 is driven to rotate in the forward direction.

Specifically, when a designated fan operating condition that supplies the radiator 4 with a cooling wind is met, the control device 60 actuates the second fan 54 in such a manner that the second fan 54 rotates in the forward direction. In addition, if engine load is higher than a designated threshold value when the fan operating condition described above is met, the control device 60 actuates the first fan 52 as well as the second fan 54.

If the second fan 54 is actuated, the wind from the second fan 54 flows toward the vehicle upper side along the portion of the cover piece 42 located on the vehicle front side where a closed flap 48 is arranged, and then flows toward the vehicle rear side. That is to say, since the flap 48 is closed, introduction of the wind from the second fan 54 into the interior of the acoustic insulation cover 40 is reduced. In addition, since the flap 48 is also closed when the second fan 54 is not actuated during engine operation, introduction of the relative wind into the interior of the acoustic insulation cover 40 is also reduced during running of the vehicle 1.

If, on the other hand, the first fan 52 is actuated, air blown by the first fan 52 flows toward the portions of the internal combustion engine 20 located on the vehicle front side that are not covered by the cover piece 42 (More specifically, flows toward the alternator 36 and the A/C compressor 38 and also the respective portions of the intake manifold 24 and the engine main body 28 (cylinder block 32) located on the vehicle right side in the vehicle front view). As a result, engine parts which generate heat (for example, alternator 36, A/C compressor 38, and intake system parts, such as intake manifold 24) are cooled by the wind from the first fan 52.

Furthermore, in the cylinder block 32, a water jacket (not shown) through which engine cooling water flows is formed. Air blown by the first fan 52 flows around the engine parts described above, and then flows along the cylinder block 32, and, as a result, is taken into the interior of the acoustic insulation cover 40 (i.e., the interior of each of the cover pieces 42 and 44). Also, this air introduced into the interior of the acoustic insulation cover 40 flows toward the rear side of the vehicle 1 through a gap between the cover pieces 42, 44 and the cylinder block 32, and is then discharged from the acoustic insulation cover 40. In the course of air flowing in this way, portions of the cylinder block 32 located in the vicinity of the water jacket are cooled by this air. Therefore, an excess increase of engine cooling water temperature is also reduced at high load conditions.

1-2-2. Operation During Engine Stop

Figure 5:
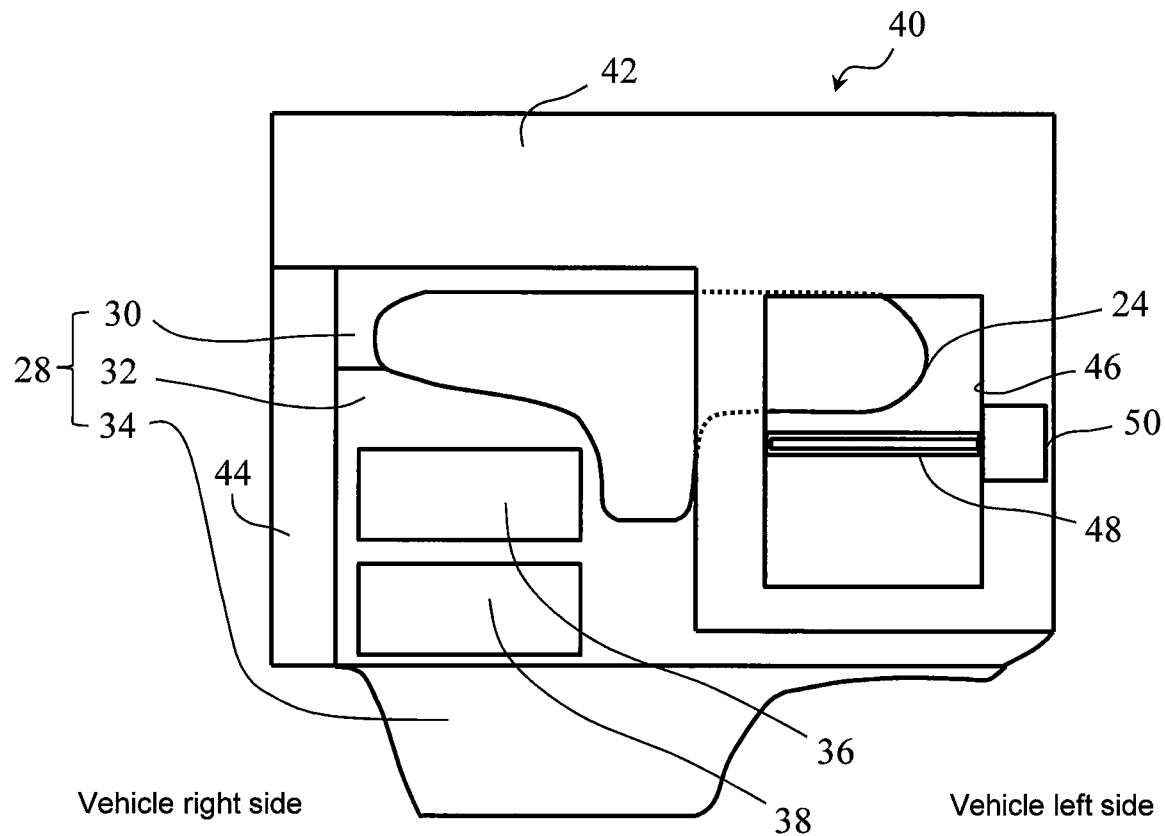
FIG. 5 is a diagram (vehicle front view) that schematically illustrates the internal combustion engine with a flap open.

Next, an operation of the acoustic insulation system 10 during stop of the internal combustion engine 20 will be described with reference to FIGS. 5 to 7. FIGS. 5 and 6 are diagrams (vehicle front view and vehicle side view) that schematically illustrate the internal combustion engine 20 with the flap 48 open. FIG. 7 is a diagram that schematically illustrates an air flow that is formed during stop of the internal combustion engine 20.

During engine stop, the control device 60 controls the electric motor 50 such that the flap 48 opens. As a result, as shown in FIGS. 5 and 6, the opening portion 46 is opened by the flap 48. Also, during engine stop, the control device 60 actuates the first and second fans 52 and 54 as follows at a designated execution timing (for example, immediately after completion of the engine stop). That is to say, the control device 60 actuates the first fan 52 (i.e., rotates the first fan 52 in the forward direction) over a designated time period, and also actuates the second fan 54 in such a manner that the second fan 54 rotates in the direction opposite to the forward direction. In other words, the second fan 54 is actuated during engine stop so as to blow air in the direction opposite to the flow direction of air by the first fan 52.

The operation during engine stop is similar to that during engine operation in terms of air that is blown by the first fan 52 when the first fan 52 is actuated as described above during engine stop being taken into the interior of the acoustic insulation cover 40 (i.e., cover pieces 42 and 44). On that basis, during engine stop, the second fan 54 is driven to rotate in the direction opposite to the forward direction. As a result, as shown in FIG. 6, air in the acoustic insulation cover 40 (cover piece 42) is sucked out from the opening portion 46 by the second fan 54. In addition, the specification of the second fan 54 is determined such that, when the second fan 54 is rotated in the direction opposite to the forward direction in this way, air in the cover piece 42 can be sucked out through the opening portion 46.

Figure 7:
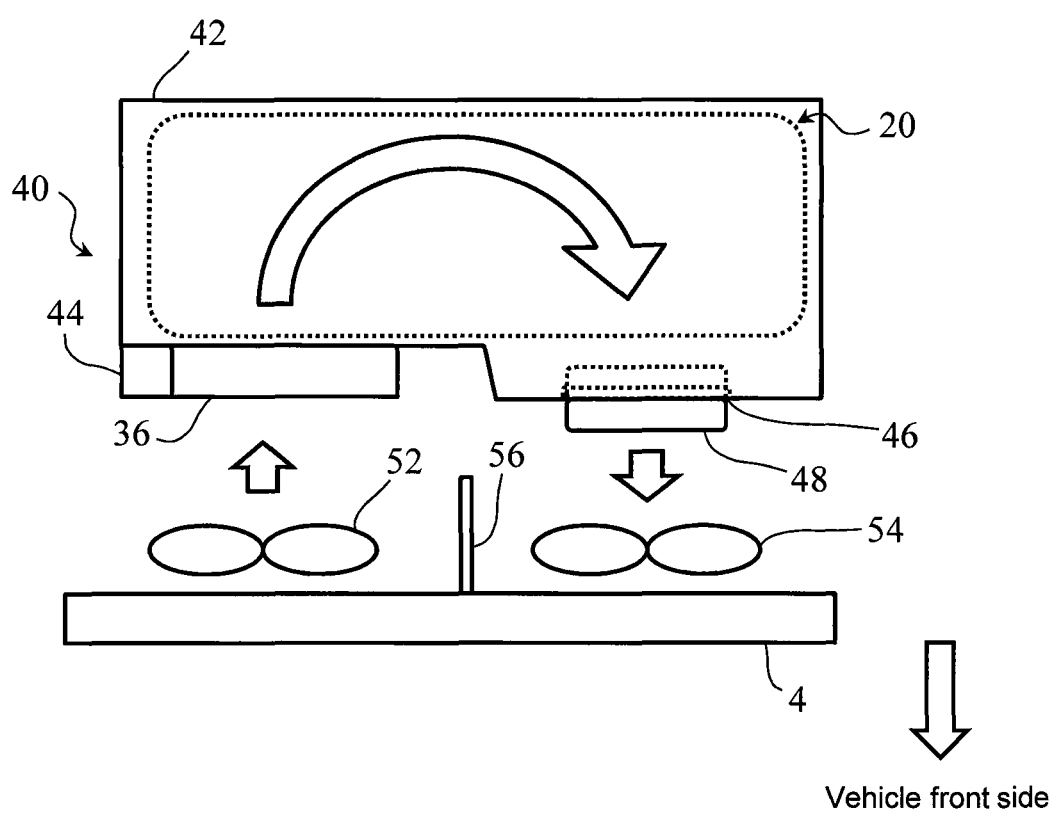
FIG. 7 is a diagram that schematically illustrates an air flow that is formed during stop of the internal combustion engine.

As a result of the flap 48 being opened and the first and second fans 52 and 54 being actuated described above, air in the acoustic insulation cover 40 can form an air flow that circulates as shown by arrows in FIG. 7. In more detail, a part of air blown by the first fan 52 is taken into the interior of the cover piece 42, then flows toward the upper side, and then flows toward the vehicle left side from the vehicle right side through a gap between the upper portion of the cylinder head 30 and the cover piece 42. Thereafter, this air is discharged outside the acoustic insulation cover 40 through the opening portion 46. With the circulating air flow formed inside the cover piece 42 in this way, the interior of the cover piece 42 can be ventilated.

Furthermore, the flow of air that is blown by the first fan 52 includes an air flow that passes through the cover piece 44 and is discharged outside the cover piece 44 at the vehicle rear side. With this kind of air flow, the interior of the cover piece 44 can also be ventilated.

1-3. Advantageous Effects

As described so far, according to the first fan 52 (that is driven to rotate in the forward direction), air can be introduced toward the interior of the acoustic insulation cover 40. Also, according to the second fan 54, when the second fan 54 is driven to rotate in the direction opposite to the forward direction, air can be discharged from the interior of the acoustic insulation cover 40. According to the acoustic insulation system 10 of the present embodiment, even when, since the internal combustion engine 20 is stopped and the vehicle 1 is also stopped accordingly, the relative wind cannot be used, the ventilation of the interior of the acoustic insulation cover 40 can be efficiently performed by the use of these fans 52 and 54.

Moreover, according to the ventilation of the interior of the acoustic insulation cover 40, the following advantageous effects can be achieved.

(1) Discharge of heat from the interior of the acoustic insulation cover 40 (including cooling of the internal combustion engine 20)

(2) Reduction of erosion of the engine parts associated with facilitation of drying of the interior space (i.e., the gap between the acoustic insulation cover 40 and the internal combustion engine 20) of the acoustic insulation cover 40

(3) Reduction of occurrence of unusual odor (due to fuel, engine lubricating oil and water) in the interior of the acoustic insulation cover 40 associated with the facilitation of drying described above Moreover, according to the acoustic insulation system 10 of the present embodiment, the opening portion 46 of the acoustic insulation cover 40 (cover piece 42) and the flap 48 are arranged at the opposed portion that is opposed to the second fan 54. According to this kind of configuration, a high degree of freedom of formation of an air flow around the acoustic insulation cover 40 can be achieved by the use of opening and closing of the flap 48 and switching of the air blowing directions of the second fan 54. In detail, by reversely rotating the second fan 54 when the flap 48 is open, discharge of air from the interior of the acoustic insulation cover 40 can be facilitated. Also, if there is a request to cause the second fan 54 to form an air flow in the forward direction when introduction of air into the interior of the acoustic insulation cover 40 is not required, the flap 48 is closed, and thus, the second fan 54 can be actuated while reducing introduction of air into the interior of the acoustic insulation cover 40. Therefore, in an example in which the second fan 54 has a function as a cooling fan of the radiator 4 as in the acoustic insulation system 10, when there is a request to cause the second fan 54 to supply a cooling wind as one example of the above-mentioned request during engine operation, the cooling wind can be supplied to the radiator 4 while reducing the introduction of air into the interior of the acoustic insulation cover 40.

Moreover, according to the acoustic insulation system 10 of the present embodiment, the flap 48 is configured to close during engine operation and open during engine stop. By opening and closing the flap 48 as needed in this way, reduction of heat release (cooling) of the internal combustion engine 20 during engine operation and facilitation of heat release (cooling) of the internal combustion engine 20 during engine stop can be both achieved. In detail, during engine stop, introduction of a wind from the second fan 54 or of the relative wind into the interior of the acoustic insulation cover 40 can be reduced, and the heat release of the internal combustion engine 20 can thus be reduced. In addition, during engine stop, even when the relative wind cannot be used, the ventilation of the acoustic insulation cover 40 can be performed by opening the flap 38 and reversely rotating the second fan 54, and the heat release of the internal combustion engine 20 can thus be facilitated.

Furthermore, according to the acoustic insulation system 10 of present embodiment, the first fan 52 and the second fan 54 are integrally arranged in parallel with the bulkhead 56 interposed therebetween. The bulkhead 56 is formed so as to protrude toward the internal combustion engine 20 and separate the flow of air by the first fan 52 and the flow of air by the second fan 54. Also, the second fan 54 is configured to be able to blow air in the direction opposite to the flow direction of air by the first fan 52. According to this kind of configuration, the first fan 52 having the function of introducing air toward the interior of the acoustic insulation cover 40 (i.e., the side of the internal combustion engine 20) and the second fan 54 having the function of discharging air from the interior of the acoustic insulation cover 40 (i.e., the side of the internal combustion engine 20) can be compactly modularized. This is favorable to improve the mounting ability of the first and second fans 52 and 54 on the vehicle 1.

Additionally, according to the acoustic insulation system 10 of the present embodiment, the engine parts which generate heat (for example, alternator 36, A/C compressor 38, and intake system parts, such as intake manifold 24) are installed on the engine main body 28 (cylinder block 32). Also, the acoustic insulation system 10 is configured such that the portions on which (at least one of) these engine parts are installed are not covered by the cover piece 42. Moreover, the first fan 52 is arranged so as to be opposed to these portions. As a result, these engine parts can be efficiently cooled by the use of air that is blown by the first fan 52.

2. Other Embodiments 2-1. Other Examples of Installation of First and Second Fans In the first embodiment described above, the first and second fans 52 and 54 are installed on the radiator 4. However, the first and second fans may alternatively be installed on any other desired portions in the engine compartment, as long as the first fan is able to introduce air toward the interior of the acoustic insulation cover and the second fan is able to discharge air from the interior of the acoustic insulation cover. Specifically, these fans may be installed on, for example, an acoustic insulation cover, an internal combustion engine or a vehicle body part other than the radiator.

Furthermore, in the first embodiment, the first fan 52 and the second fan 54 are integrally arranged in parallel with the bulkhead 56 interposed therebetween. However, the first fan and the second fan according to the present disclosure may not always be integrally arranged in parallel and alternatively be arranged at respective locations separate from each other. In addition, the number of the first fan is not limited to one and may be plural, and, similarly, the number of the second fan is not limited to one and may be plural.

2-2. Another Example of Acoustic Insulation Cover

In the first embodiment, the opening portion 46 and the flap 48 are arranged at the opposed portion of the acoustic insulation cover 40 that is opposed to the second fan 54. However, the "acoustic insulation cover" according to the present disclosure may not always include these opening portion and flap.

Furthermore, contrary to the example of the acoustic insulation cover 40, the "acoustic insulation cover" according to the present disclosure may, for example, cover a portion (back surface) of an internal combustion engine located on the vehicle rear side while avoiding exhaust system parts, or cover a portion of an engine main body located on the vehicle left side (i.e., a side end surface of the engine main body located on the side where a transmission or a vehicle-driving motor is arranged). To be more specific, this side end surface may alternatively be covered as a result of the transmission or the vehicle driving motor being covered by a desired cover piece. Also, the acoustic insulation system may alternatively be configured, for example, by the use of, as well as the cover piece 44, cover pieces that cover these bask surface and the side end surface, such that a circulating air flow as described with reference to FIG. 7 is formed inside the acoustic insulation cover.

The embodiments and modification examples described above may be combined in other ways than those explicitly described above as required and may be modified in various ways without departing from the scope of the present disclosure.

What is claimed is:

1. An acoustic insulation system for an internal combustion engine mounted on a vehicle, the acoustic insulation system comprising:
   an acoustic insulation cover configured to cover the internal combustion engine with a gap between the acoustic insulation cover and the internal combustion engine;
   a radiator;
   a first fan configured to introduce air through the radiator toward an interior of the acoustic insulation cover; and
   a second fan configured to discharge air through the radiator from the interior of the acoustic insulation cover, wherein
   the first fan and the second fan are attached to the radiator on a vehicle rear side of the radiator and between the acoustic insulation cover and the radiator, and are arranged so that a direction of a flow of air by the first fan and a direction of a flow of air by the second fan are parallel but opposite directions, and a bulkhead attached to the radiator between the first fan and the second fan protrudes toward the internal combustion engine and separates the flow of air by the first fan from the flow of air by the second fan.

2. The acoustic insulation system according to claim 1, wherein the acoustic insulation cover includes an opposed portion that is opposed to the second fan, and wherein the opposed portion includes an opening portion and a flap configured to open and close the opening portion.

3. The acoustic insulation system according to claim 2, wherein the flap is configured to close during operation of the internal combustion engine and open during stop of the internal combustion engine.

4. The acoustic insulation system according to claim 2, wherein the flap is configured to close during operation of the internal combustion engine and open during stop of the internal combustion engine, and wherein the second fan is configured, during the stop of the internal combustion engine, to blow air in the direction of the flow of air by the second fan.

5. The acoustic insulation system according to claim 1, wherein the internal combustion engine includes a portion which is not covered by the acoustic insulation cover, and wherein the first fan is opposed to the internal combustion engine at the portion which is not covered by the acoustic insulation cover.

* * * * *